United States Patent
Wong et al.

(10) Patent No.: US 6,687,786 B1
(45) Date of Patent: Feb. 3, 2004

(54) AUTOMATED FREE ENTRY MANAGEMENT FOR CONTENT-ADDRESSABLE MEMORY USING VIRTUAL PAGE PRE-FETCH

(75) Inventors: Calvin C. Wong, Milpitas, CA (US); Jonathan M. Parlan, Los Altos, CA (US); Robert L. Hoffman, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 223 days.

(21) Appl. No.: 09/966,059

(22) Filed: Sep. 28, 2001

(51) Int. Cl.[7] ............................................... G06F 12/00
(52) U.S. Cl. ........................ 711/108; 711/206; 365/49
(58) Field of Search .................................. 711/108, 171, 711/203–209; 365/49

(56) References Cited

U.S. PATENT DOCUMENTS

| | | | | |
|---|---|---|---|---|
| 5,392,415 A | * | 2/1995 | Badovinatz et al. | 709/100 |
| 5,600,820 A | * | 2/1997 | Johnson | 711/171 |
| 6,026,467 A | * | 2/2000 | Petty | 711/108 |
| 6,366,996 B1 | * | 4/2002 | Hobson et al. | 711/206 |
| 6,425,048 B1 | * | 7/2002 | Kaganoi | 711/108 |
| 6,446,188 B1 | * | 9/2002 | Henderson et al. | 711/206 |
| 6,477,634 B1 | * | 11/2002 | Comment | 711/207 |
| 6,490,671 B1 | * | 12/2002 | Frank et al. | 711/208 |
| 6,516,383 B1 | * | 2/2003 | Patra et al. | 711/108 |

* cited by examiner

*Primary Examiner*—Nasser Moazzami
(74) *Attorney, Agent, or Firm*—Campbell Stephenson Ascolese LLP (57) ABSTRACT

A method of managing free entries in a CAM using virtual page pre-fetch is defined. The memory locations in a CAM are partitioned into multiple virtual pages (VP). The allocation of memory location to VPs is independent of the physical address of the location. The address of an empty location (free entry) from each VP is pre-fetched and is maintained in a free entry list. Consecutive write operations are scheduled in different VPs to avoid a back-to-back write in the same VP which eliminates resource contention. When data is retrieved from a location in the CAM, that location becomes available for next write. Because the allocation of a location to VPs is independent of the physical address of the location, when the location becomes available, a new VP assignment is made for that location.

85 Claims, 10 Drawing Sheets

AUTOMATED FREE ENTRY MANAGEMENT FOR CONTENT-ADDRESSABLE MEMORY USING VIRTUAL PAGE PRE-FETCH

BACKGROUND OF THE INVENTION

1. Field of the Invention

This invention relates to the field of data memories, and more particularly relates to storage of information using content-addressable Memory.

2. Description of the Related Art

A Content Addressable Memory (CAM) is a specialized memory device that is used for fast searches of data stored in the CAM. In some networking systems, CAMs are used to store packet pointers. When packets arrive at such a system, the system assigns a specific identification tag (ID) to each packet and places the ID and the packet pointer into a CAM. The packets are later retrieved by searching for a given ID. Generally, a CAM's architecture includes a table of memory cells to store data and control logic to search and compare the data in the table. To search for a data, a system provides the data to be searched and the control logic of the CAM performs the search and provides search results to the system. Two types of CAMs are binary CAMs and Ternary CAMs (TCAMs). A binary CAM searches for and recognizes data that is comprised of bits that can have two states, 0 and 1. A TCAM searches for and recognizes three states: 0, 1, and X ("don't care").

When a data is to be written into a CAM, the system must usually find an empty location (free entry) in the CAM. Generally, the process of data search in a given CAM table takes one clock cycle. Multiple clock cycles may be required to write data to an entry in the CAM.

One method to find empty locations in a CAM is to maintain a list of locations that are empty. This method requires a large memory structure to maintain such list. Another method of finding empty locations in the CAM is to designate one bit of each location in the CAM to represent whether the location is empty or occupied. Every time data is to be written into the CAM, the system looks up an empty location by searching for the designated bit. The problem with this method is that there is latency associated with the search. Once a lookup instruction is posted to the CAM, the system waits until an empty location address is returned. The lookup process can take a significant amount of time. In addition, a lookup must follow every write to the CAM. In some cases, the lookup process uses up to 20 percent of the CAM bandwidth.

SUMMARY

The present invention describes a method for managing free entries in a content-addressable memory. The method includes assigning memory locations in the content-addressable memory to multiple virtual pages, pre-fetching an address of at least one free memory location from at least one of the virtual pages, and storing the address in a free entry list. The method further includes retrieving the address from the free entry list and storing data in the content-addressable memory using the address. The assigning of the virtual pages is independent of a physical address of the memory locations. In one embodiment of the present invention, the storing of the address in the free entry list is done on a round-robin basis for each one of the virtual pages. In another embodiment of the present invention, each writing of data is done in a different virtual page than a previous writing of data, and the pre-fetching the address of free memory location in one of the virtual pages is done while data is being written in a different virtual page.

The method further includes receiving a first data to write in the content-addressable memory, searching for a first address of first memory location in the free entry list, and if the first address of the first memory location is not found, generating an error message. The method further includes if the first address of the first memory location is found in the free entry list, writing the first data in the first memory location, setting a valid bit of the first memory location to indicate 'not free', removing the first address of the first memory location from the free entry list, pre-fetching a second address of a second free memory location in the content-addressable memory and storing the second address of the second free memory location in the free entry list. In one embodiment of the present invention, the pre-fetching of the second address of the second free memory location is done from one of the virtual pages assigned to the first memory location.

In one embodiment of the present invention, the method further includes receiving a request to retrieve a second data from the content-addressable memory. During retrieval, the method further includes searching for the second data in the content-addressable memory and if the second data is not found in the content-addressable memory, responding with an error. If the second data is found in the content-addressable memory, retrieving the second data from a third memory location, setting the valid bit of the third memory location to indicate 'free' and assigning one of the virtual pages to the third memory location. In one embodiment of the present invention, the third memory location is assigned a different virtual page than the third memory location had before the retrieval of the second data The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and numerous objects, features, and advantages made apparent to those skilled in the art by referencing the accompanying drawing.

DETAILED DESCRIPTION OF THE INVENTION

The following is intended to provide a detailed description of an example of the invention and should not be taken to be limiting of the invention itself. Rather, any number of variations may fall within the scope of the invention which is defined in the claims following the description.

Introduction

The present invention defines a method of managing free entries in a CAM (e.g., binary CAM, TCAM and the like) using virtual page pre-fetch. Using such an approach, the memory locations in a CAM are partitioned into multiple virtual pages (VP). The allocation of memory location to VPs is independent of the physical address of the location. The address of an empty location (free entry) from each VP is pre-fetched and is maintained in a free entry list. Consecutive write operations are scheduled in different VPs to avoid a back-to-back write in the same VP, thereby eliminating resource contention. Upon initialization, each entry of the CAM is assigned to a virtual page. A free entry list that is as deep as the number of virtual pages is initialized with an address pointer corresponding to an unused location in each VP. A valid bit for each entry is set to be invalid (free).

When data is to be written, the location is specified by the free entry list. After the data has been written, the address pointer of that location is removed from the free entry list. Immediately following the write operation, a lookup of next free entry in the given VP is scheduled. After the result from the lookup arrives, the free entry list is refreshed to include next free location of the given VP. Immediately after the lookup is scheduled, the next write operation begins on a different VP specified by the free entry list. The lookup of the preceding VP does not conflict with the write of the current VP thus reducing the lookup latency.

When the data is retrieved from a location in the CAM, that location needs to be returned to the pool of available free entries and assigned a new VP. Because the assignment of a VP to a location is independent of the physical address of that location, the new VP may be different from the previously assigned VP.

System Architecture

Figure 1:
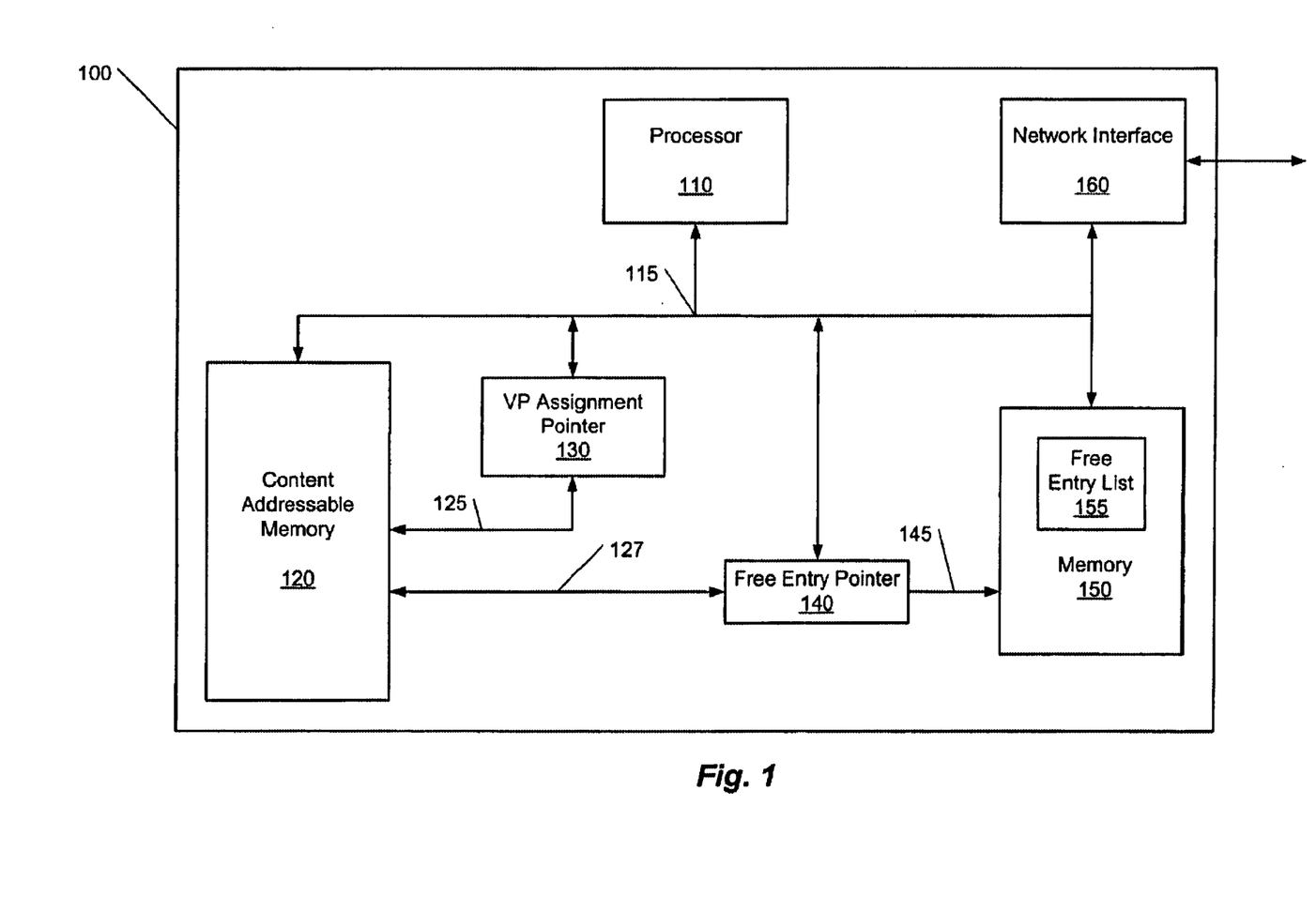
FIG. 1 illustrates an example of a system incorporating automated free entry management for content-addressable memories using virtual page pre-fetch according to an embodiment of the present invention.

FIG. 1 illustrates an example of a system incorporating automated free entry management for content-addressable memories using virtual page pre-fetch according to an embodiment of the present invention. System 100 includes a processor 110. Processor 110 is coupled to various system components via a link 115. Link 115 carries various system signals (e.g., data, control, address and the like). For illustration purposes, a common link, link 115 is described. However, it will be apparent to one skilled in the art that link 115 can be configured using various data transport techniques (local bus, multiplexed bus, switching fabric or the like).

A content-addressable memory (CAM) 120 is coupled to processor 110. CAM 120 is coupled to a VP assignment pointer 130 via a link, link 125. VP assignment pointer 130 receives the address of a free (unused) location from CAM 120 and assigns a VP to that location according to a predetermined VP allocation scheme. A free entry pointer 140 is coupled to CAM 120 via a link 127. Free entry pointer 140 is further coupled to a memory 150 via a link 145. For illustration purposes, stand alone VP assignment pointer 130 and free entry pointer 140 are shown. However, it will be apparent to one skilled in the art that these pointers can be configured using any appropriate scheme (i.e., e.g., dedicated micro-controller, software vectors, software-based pointers or the like). Memory 150 includes a free entry list 155. Free entry list 155 can be configured using any storage scheme (individual memory module, buffer registers, embedded memory module in CAM 120 or the like). Free entry list 155 stores the addresses of free locations in each VP in CAM 120. Free entry pointer 140 identifies a free (unused) location in a given VP and stores the address of that location in free entry list 155. Memory 150 is coupled to a network interface 160. Network interface 160 provides input/output packet processing and appropriate protocol-related interfaces for system 100.

CAM Initialization

Figure 2:
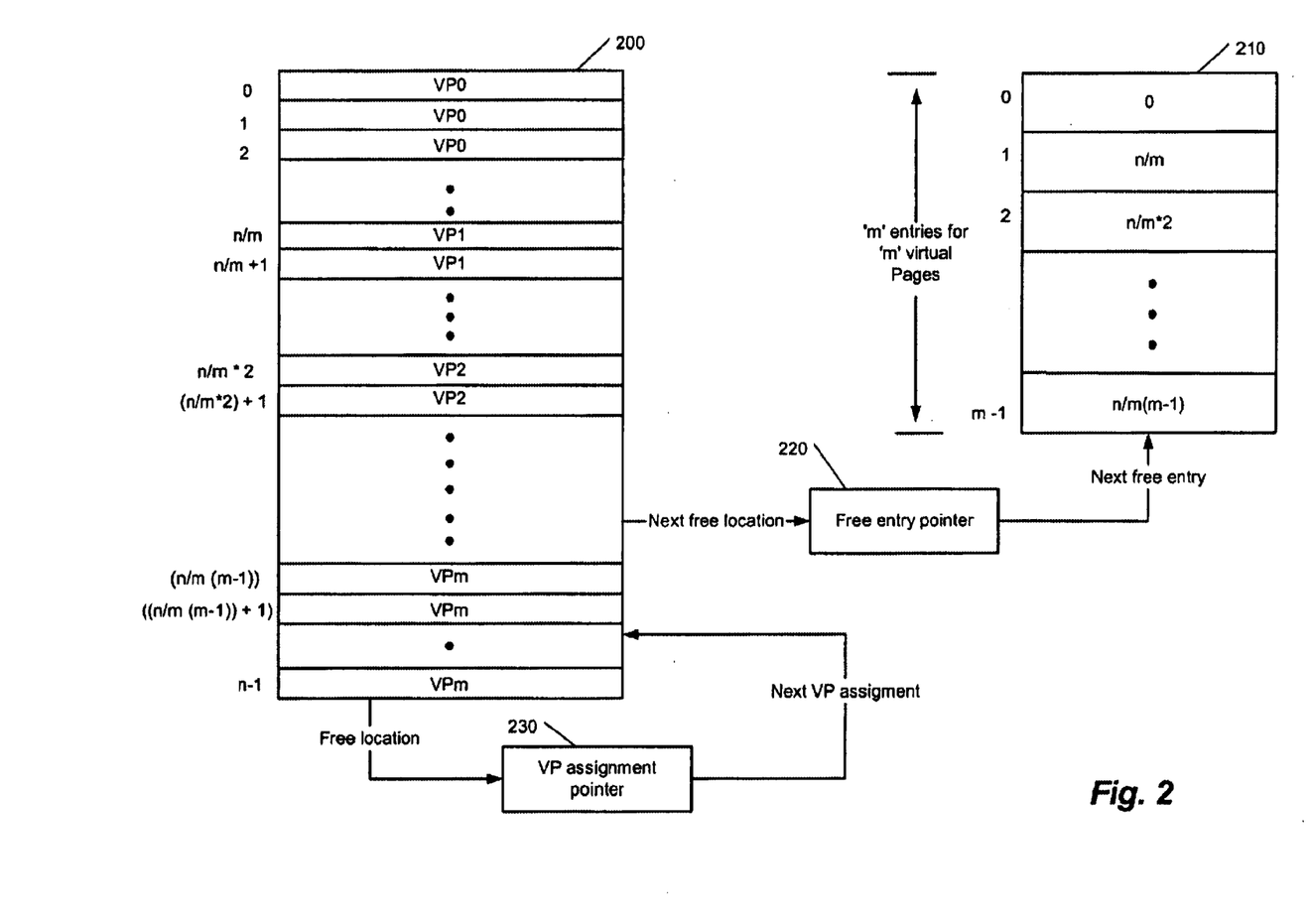
FIG. 2 illustrates an example of CAM initialization according to one embodiment of the present invention.

FIG. 2 illustrates an example of CAM initialization according to one embodiment of the present invention. A CAM 200 includes 'n' locations, locations 0–(n−1). For purposes of illustration, in this example, the locations of CAM 200 are equally divided among 'm' VPs. VPs can be configured to include any number of locations. At initialization, each CAM location is populated with a VP number assigned to that location. For example, locations starting from address 0 are assigned to VP0. Because there are 'm' VPs, 'n/m' locations are assigned to VP0. Thus, the first location for VP1 is location address 'n/m' and first location for VP2 is location address 'n/m*2' and so on. However, the allocation of locations to each VP is independent of the physical address of locations. Any physical location in CAM 200 can be assigned in any order to any VP. One bit of each CAM location can be dedicated to indicate whether the location is invalid (free). In addition to one bit, $Log_2$ m bits are dedicated to represent one of m VPs assigned to the location.

The numbers and sizes of VPs are selected according to the physical characteristics of a given CAM (i.e., e.g., organization of memory cells, control logic, latencies in lookup, write, compare and the like). For example, CAM 200 has a certain latency associated with the lookup of a location and CAM 200 receives write requests at certain frequencies. The number of locations per VP can be selected such that after the write operation, the lookup of a free entry in a given VP can be completed before CAM 200 receives next write request.

A free entry list 210 is a memory buffer that is as deep as the number of VPs (i.e., 'm'). Free entry list 210 can be configured using any buffer scheme (such as for example, first-in-first-out (FIFO), programmable software pointer and the like). Free entry list 210 stores the address pointer of an available CAM location for each VP. At initialization, free entry list 210 points to the addresses of the first free location in each VP. However, free entry list 210 can be initialized to point to the address of any available location in each VP and the address pointers in free entry list 210 can be populated in any order. In the present example, free entry list 210 is configured as a FIFO. The system writes to CAM 200 using the top address in free entry list 210 (e.g., the address of the first location in VP0). Free entry list 210 can be programmed to point to any address of free location in CAM 200 in any order desired by the user.

When the system completes a write to the first location pointed to by free entry list 210, the address of that location is removed from free entry list 210 and the next address location in free entry list 210 becomes the next available location in CAM 200. After the write to a location in a VP is completed, a lookup of the next available location in that VP is scheduled. When the next available location in the VP is identified, the address of that location is appended to the bottom of free entry list 210. The system continues to write to a location identified by free entry list 210 in each VP. Every write operation is in a different VP and each write operation is followed by a lookup of next available location in the same VP.

When data is retrieved from a location in a CAM, that location becomes available or free. Because the assignment of a VP to a CAM location is independent of the physical address of the location, new VP allocation is made after the location becomes available. A VP assignment pointer 230 assigns VPs to freed locations. VP assignment pointer 230 can be programmed to assign VPs to freed location in any order (e.g., round robin, highest VP first, maintain original VP assignment or assign locations in any order desired by the user).

CAM Population

Initialization

Figure 3A:
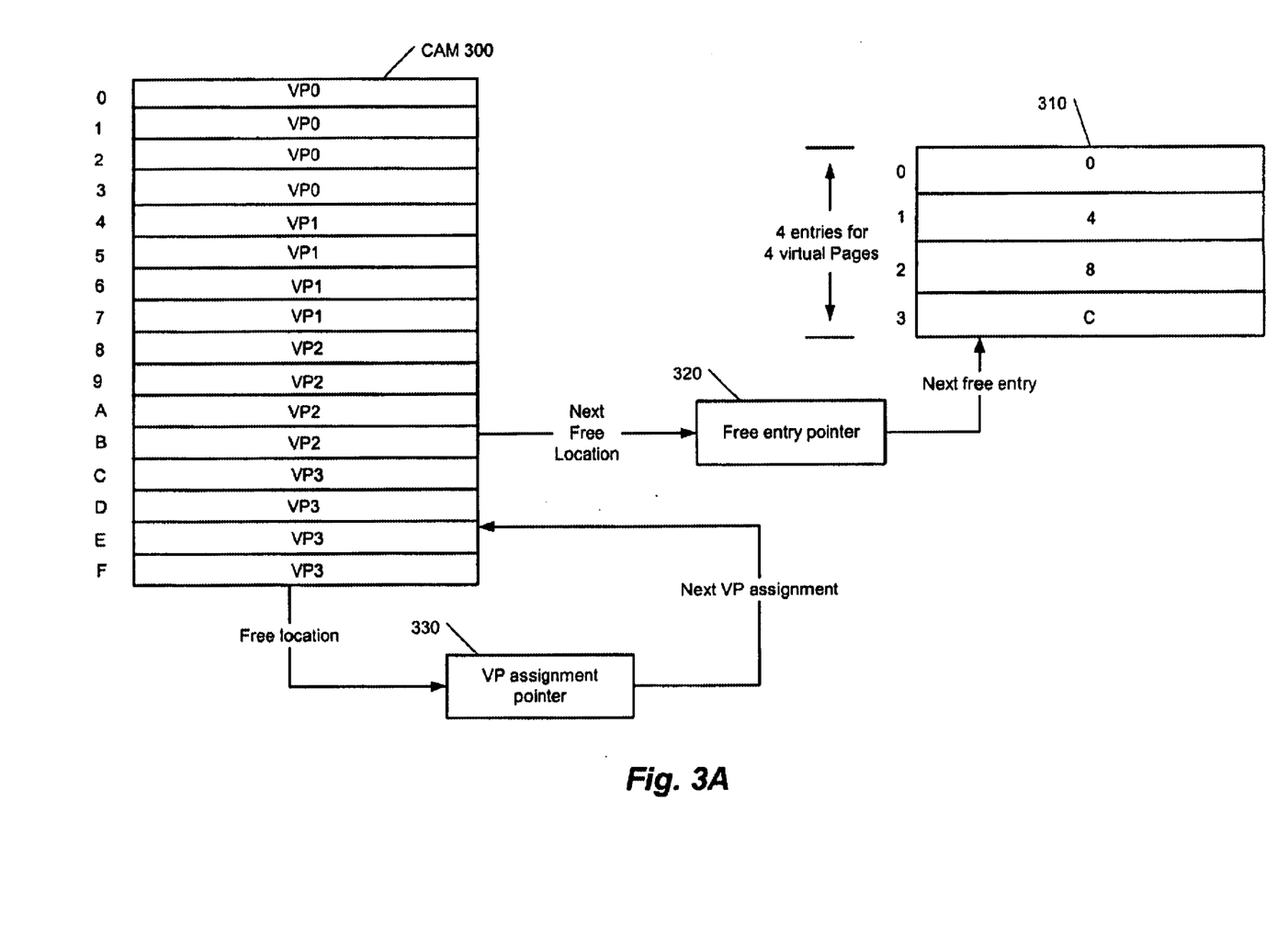
FIG. 3A illustrates an example initialization of a CAM with 16 locations according to one embodiment of the present invention.

FIG. 3A illustrates an example initialization of a CAM 300 according to one embodiment of the present invention. For illustration purposes, in the present example, CAM 300 includes 16 locations, locations 0–F. The frequency of write requests and latency of lookup requires that CAM 300 locations be divided among four VPs, VP0–VP3. Upon initialization, four locations are assigned to each VP. Locations 0–3 are assigned to VP0, locations 4–7 are assigned to VP1, locations 8-B are assigned to VP2 and locations C–F are assigned to VP3. The assignment of locations to a given virtual page is not dependent on the given location's physical address. VP assignment can be in any order. Any physical location can be assigned to any VP. One bit of each location is dedicated to indicate whether the entry in that location is invalid (i.e. the location is free). Because the locations in CAM 300 are divided among four VPs, two additional bits are reserved to indicate one of the four VPs assigned to each location.

A free entry list 310 includes four entries, entries 0–3. Each entry in free entry list 310 represents an address of a free location in each VP. In the present example, upon initialization, entry 0 is populated with the address of first free location in VP0 (location 0). Entry 1 is populated with the address of first free location in VP1 (location 4). Entry 2 is populated with the address of first free location in VP2 (location 8) and entry 3 is populated with the address of first free location in VP3 (location C). However, the entries in free entry list 310 can be populated in any order. The entries in free entry list 310 can be populated with the addresses of any location in any VP and in any order. A free entry pointer 320 searches for a free location in a VP and populates the address of that location in free entry list 310. The search for a free location in a given VP can be conducted using the valid bit assigned to that location. For example, if a search is conducted in VP0 for a free location, free entry pointer 320 searches CAM 300 using a mask that is set for VP0 (e.g., '00') and invalid entry bit (e.g., '0'). A VP assignment pointer 330 assigns VPs to locations that become free. VP assignment pointer 330 can be configured to assign VPs to freed location in any order (e.g., round robin, highest VP first, maintain original VP assignment or assign locations in any order desired by the user). In the present example, VPs are assigned in a round-robin manner. Thus, after the initialization of CAM 300, the first free location is assigned to VP0, the next free location is assigned to VP1, and so on.

Single Write Operation

Figure 3B:
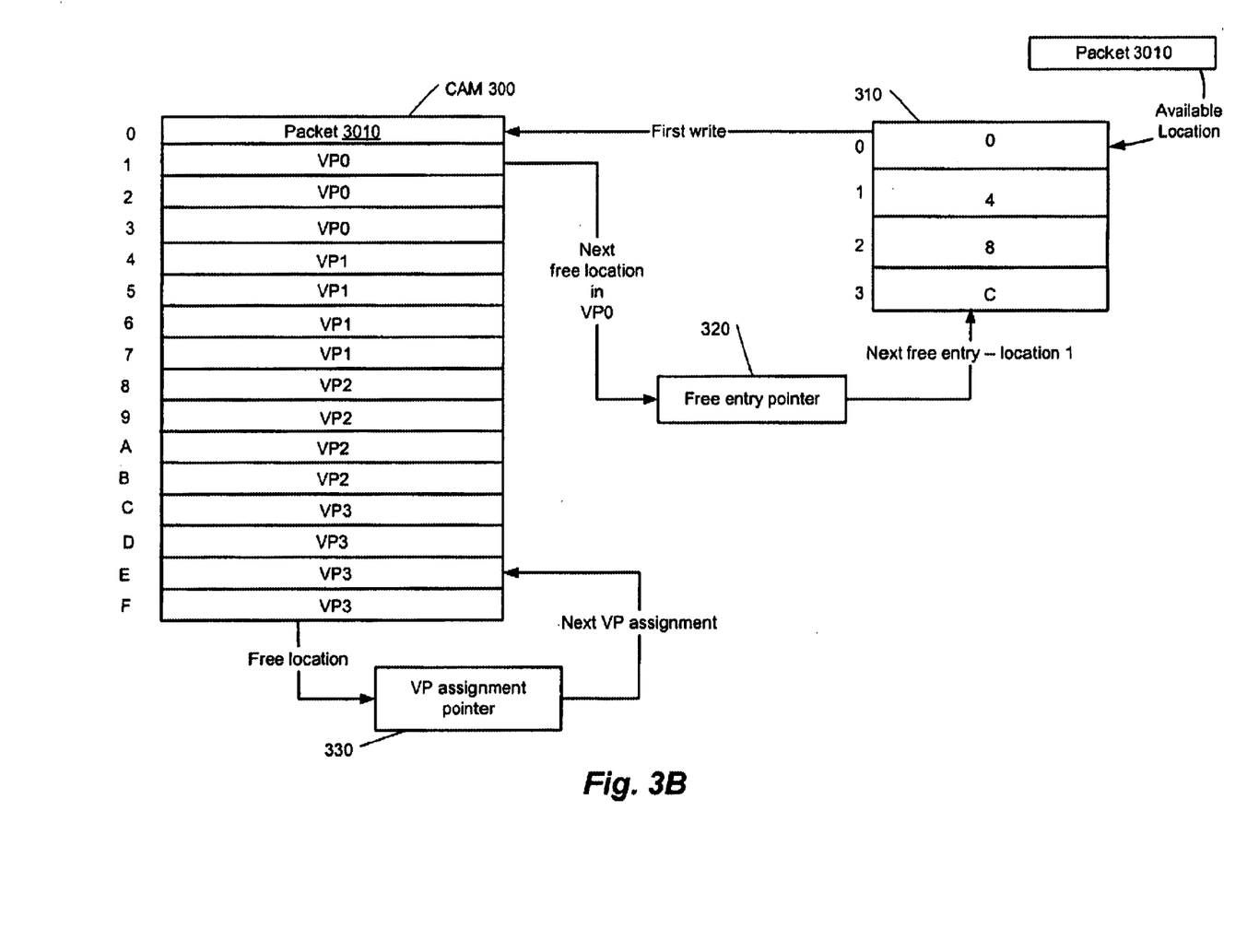
FIG. 3B illustrates an example of a single write operation in a CAM according to an embodiment of the present invention.

FIG. 3B illustrates an example of a single write operation in CAM 300 according to an embodiment of the present invention. A packet 3010 is data packet that is to be stored by the system. The system first looks up the address of an available location from free entry list 310. The first available location in free entry list 310 is location 0 (i.e. first available location of VP0). The system identifies a packet descriptor for packet 3010. Packet descriptors can include various information about packet 3010 (i.e., e.g., packet ID, packet pointer, host address and the like). The system writes packet 3010 descriptor to location 0 of VP0 in CAM 300. After packet 3010 descriptor is written into CAM 300, free entry pointer 320 schedules a lookup to locate next free entry in VP0. After the write operation to location 0 is completed, the address pointer of location 0 is removed from free entry list 310 and the next entry, location 4 of VP1, becomes the next available location in CAM 300. Free entry pointer 320 determines that next free location in VP0 is location 1 and appends the address of location 1 to bottom of free entry list 310.

Multiple Write Operations

Figure 3C:
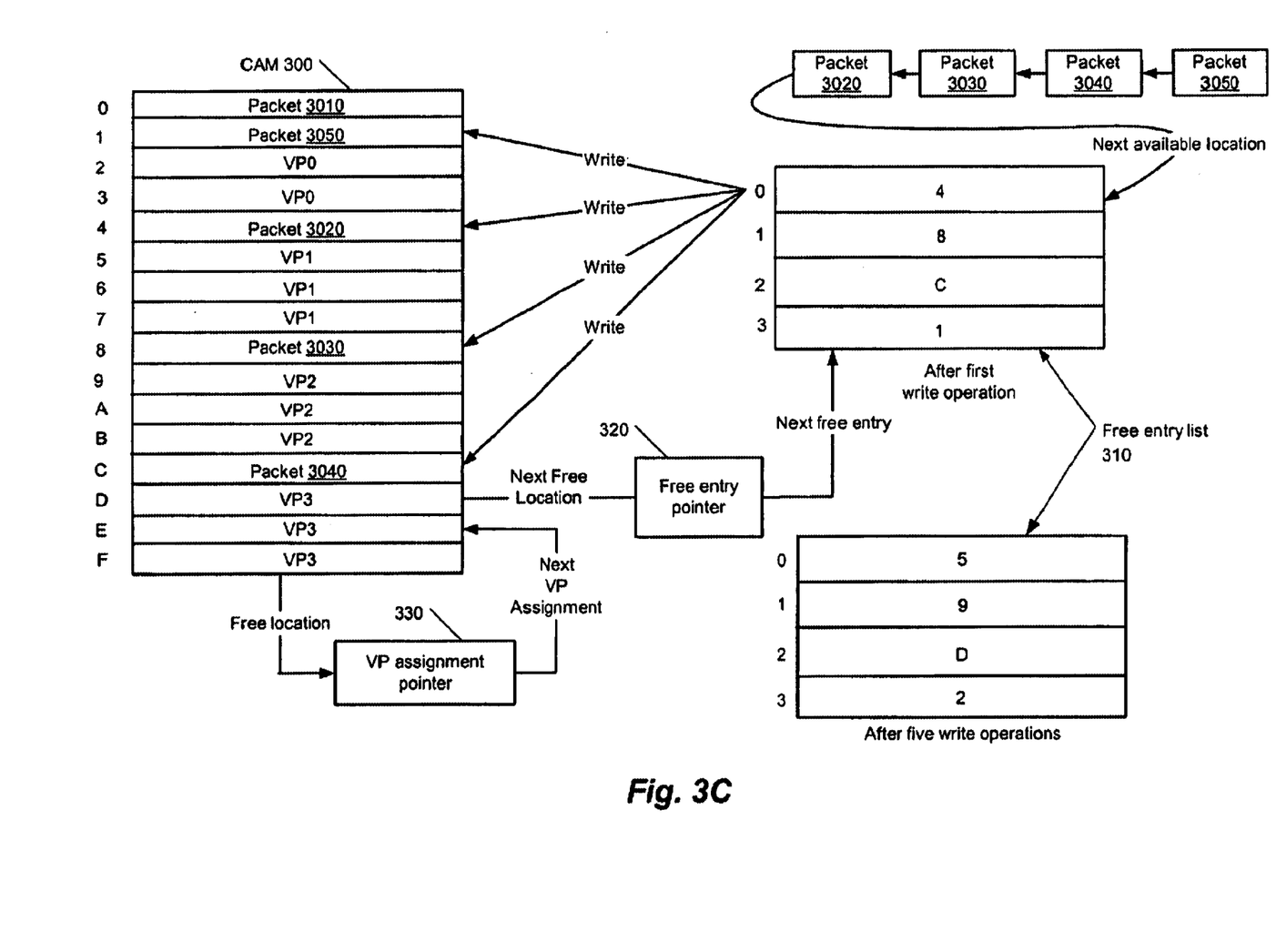
FIG. 3C illustrates an example of multiple writes in a CAM according to an embodiment of the present invention.

FIG. 3C illustrates an example of multiple writes in CAM 300 according to an embodiment of the present invention. The system receives four data packets, packet 3020, packet 3030, packet 3040 and packet 3050 in that order. The next available locations in free entry list 310 are location 4, location 8, location C and location 1. Packet 3020 descriptor is written to location 4 in VP1 and location 4 is removed from free entry list 310. Free entry pointer 320 schedules a lookup to find next free location in VP1. The next free location in VP1 is location 5. Free entry pointer 320 appends the address of location 5 at the bottom of free entry list 310. packet 3030 descriptor is written to next available location, location 8 in VP2. Location 8 is removed from free entry list 310 and a lookup of next free entry in VP2 is scheduled. The next free entry in VP2 is location 9. Free entry pointer 320 appends the address of location 9 at the bottom of free entry list 310. Similarly, packet 3040 descriptor is written to location C in VP3 and next free location in VP3, location D, is appended to free entry list 310. Packet 3050 descriptor is written to next location, location 1 in VP0 and next free location in VP0, location 2 is appended at the bottom of free entry list 310. After these write operations, free entry list 310 includes next available free locations in CAM 300. In the present example, the available free locations are populated in free entry list 310 on a round robin basis for each VP. However, any combination of schemes can be employed to populate free entry list 310. When free entry list 310 is empty, CAM 300 is full and no free location is available.

Data Retrieval from CAM

When data is retrieved from a location in a CAM, that location becomes available or free. When a location becomes available, a new VP allocation is made for that location. The allocation of a location to a VP is independent of the physical address of the location.

Figure 4A:
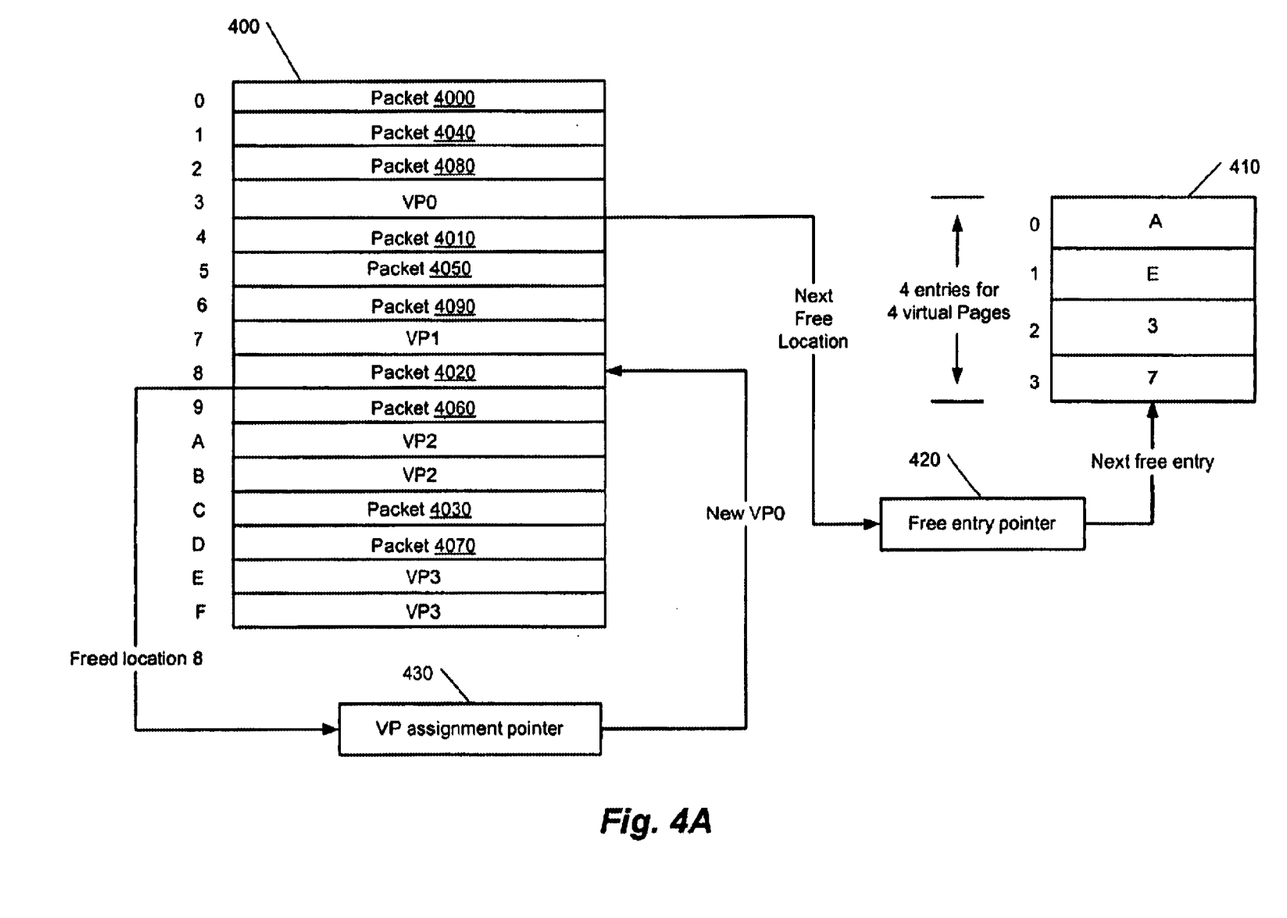
FIG. 4A illustrates an example of virtual page assignment after a single location in a CAM becomes free according to one embodiment of the present invention.

FIG. 4A illustrates an example of VP assignment after a single location in CAM 400 becomes free according to one embodiment of the present invention. CAM 400 includes 16 locations, locations 0–F. CAM 400 stores descriptors for ten packets, packets 4000–packet 4090. The packet descriptors are stored in CAM 400 on a round-robin basis for each VP. A free entry list 410 includes four address pointers. Each address pointer indicates a free location in CAM 400. A free entry pointer 420 identifies free locations in CAM 400 and populates the addresses of free locations in free entry list 410.

When the system retrieves data from a location in CAM 400, that location becomes free for next VP assignment. A VP assignment pointer 430 assigns VPs to locations that become free as a result of data retrieval. Because VP assignment is not physical address dependent, every time a location becomes free, a new VP assignment is made for that location. VP assignment pointer 430 can be programmed to assign VPs to freed locations in any order (e.g., round robin, highest VP first, maintain original VP assignment or assign locations in any order desired by the user). In the present example, VP assignment pointer 430 is programmed to assign VPs to freed locations in a round-robin manner. The first freed location is assigned to VP0, the next freed location is assigned to VP1, and so on. Because four VPs are configured in CAM 400, after assigning VP3, VP assignment pointer 430 rolls over to VP0 for next assignment.

For illustration purposes, the system retrieves a packet descriptor for packet 4020 from location 8 in CAM 400. When packet 4020 descriptor is retrieved, location 8 becomes available (free) to store the next descriptor. At initialization, location 8 was assigned to VP1. When location 8 becomes available, VP assignment pointer 430 assigns location 8 to VP0. The two virtual page reserved bits of location 8 are set to represent VP0 and the valid reserved bit is set to be invalid. Similarly, next location that becomes available is assigned to VP1, and so on.

Figure 4B:
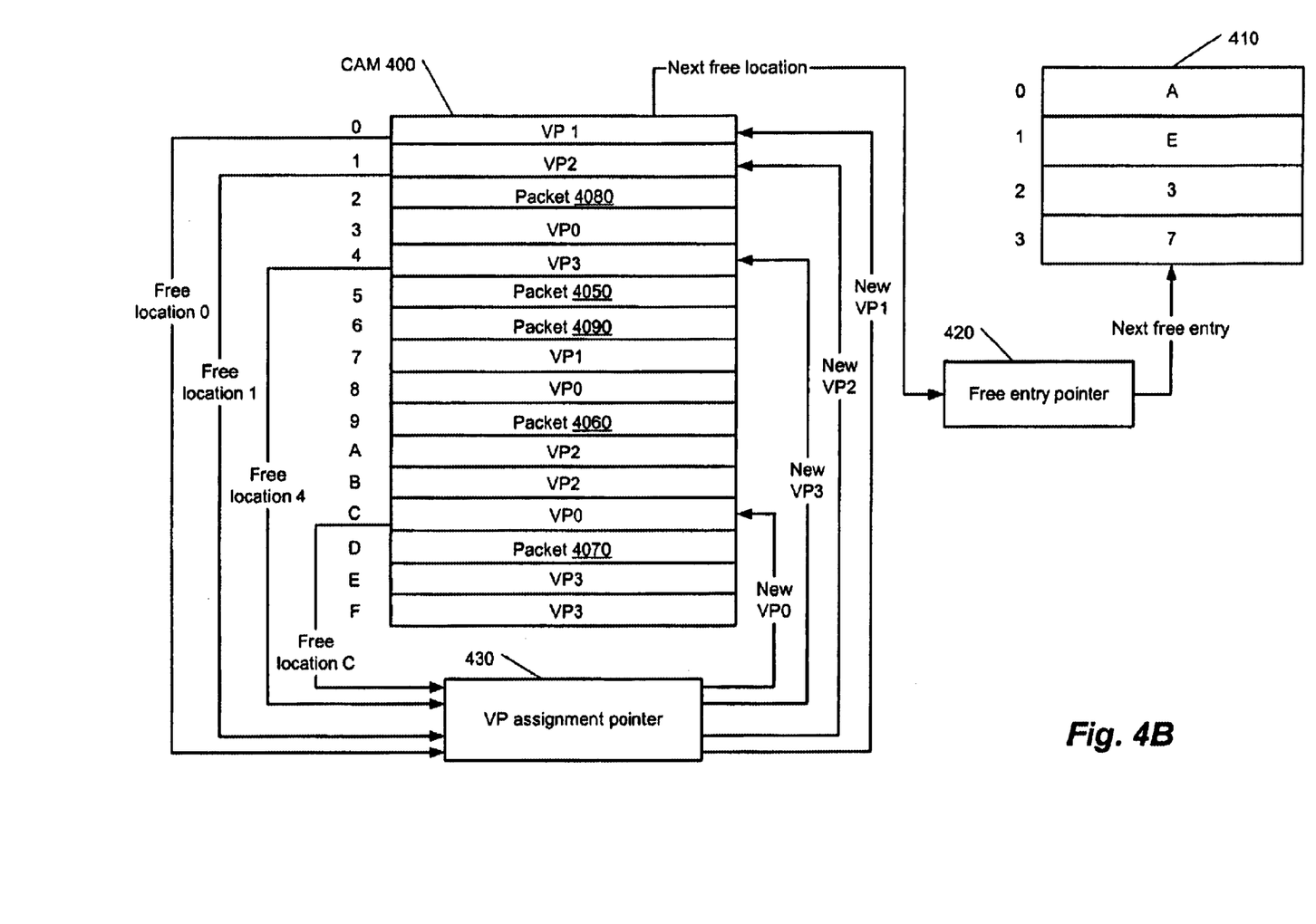
FIG. 4B illustrates an example of virtual page assignment after multiple data retrievals from a CAM according to one embodiment of the present invention.

FIG. 4B illustrates an example of VP assignment after multiple data retrievals from CAM 400 according to one embodiment of the present invention. A VP assignment pointer 430 is programmed to assign VPs in a round-robin manner. After retrieving the descriptor for packet 4020, as illustrated in the previous example, the system retrieves four packet descriptors for packet 4000, packet 4040, packet 4010 and packet 4030, in that order. When the descriptor for packet 4000 is retrieved, location 0 becomes available. At initialization, location 0 was assigned to VP0. However, VP assignment pointer 430 points to VP1 after the first write and assigns VP1 to location 0. Similarly, when the descriptor for packet 4040 is retrieved, location 1 becomes available and VP assignment pointer assigns location 1 to VP2. When the descriptor for packet 4010 is retrieved, location 4 becomes available and is assigned to VP3. Because VP assignment pointer 430 is programmed to assign VPs in a round robin manner, after the assignment of location 4 to VP3, VP assignment pointer 430 rolls over to assign VP0 to next location. When the descriptor for packet 4030 is retrieved, location C becomes available which is assigned to VP0. Each location in CAM 400 can be assigned to any VP, in any order.

Figure 5:
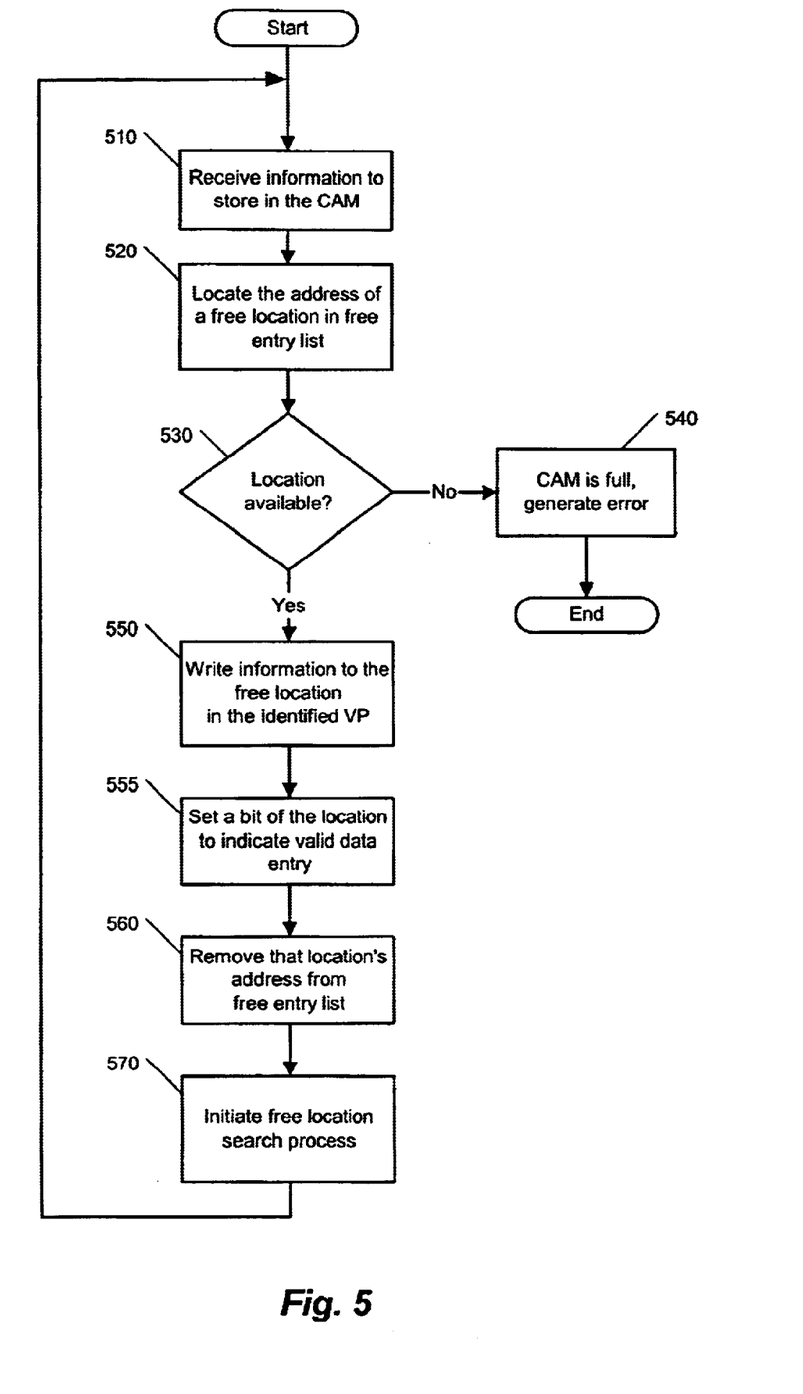
FIG. 5 is a flow chart illustrating the actions performed during the process of writing a data packet in a CAM according to an embodiment of the present invention.

FIG. 5 is a flow chart illustrating the actions performed during the process of storing information in a CAM according to an embodiment of the present invention. Initially, the system incorporating automated free entry management for content-addressable memories using virtual page pre-fetch, receives information (step 510). The system looks for an address of a free location in a free entry list stored in the system memory (step 520). The system determines if a free location in the CAM is available (step 530). If a free location is not available, the system generates an error according to the protocol used by the system (step 540). The free entry list includes the addresses of the first available location in each virtual page. An empty free entry list indicates that there is no free location in the CAM and the CAM is full. If the address of a location is found in the free entry list, the system stores the information in that location (step 550). The system sets the valid bit of the location to indicate that the location contains valid data and the location is not free (step 555). The system removes the address of that location from the free entry list (step 560). The system initiates a parallel process to locate the next free location in the same VP (step 570). The system proceeds to receive information to store in the CAM (step 510).

Figure 6:
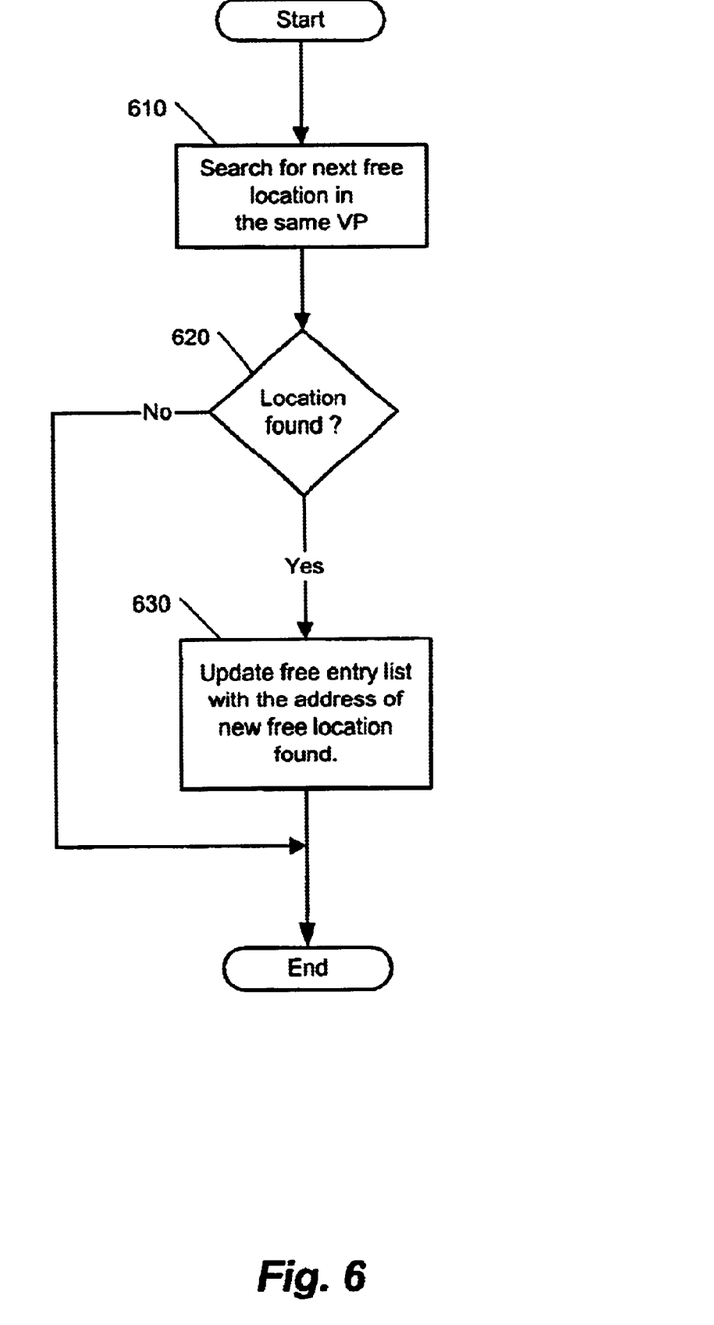
FIG. 6 is a flow chart illustrating the action performed during the process of searching a free location in a virtual page according to an embodiment of the present invention.

FIG. 6 is a flow chart illustrating the action performed during the process of searching a free location in a virtual page according to an embodiment of the present invention. The process of searching a free location in a virtual page can execute in parallel with the process of writing information in the CAM. The next write operation in the CAM begins on a different VP specified by the free entry list. The process of searching a free location in the preceding VP does not conflict with the write of the current VP. The system begins to search for next free location in the VP (step 610). The system determines whether a free location is available in the VP (step 620). If a free location in the VP is not available, the system terminates the search. If a free location is found, the system updates the free entry list with the address of that free location (step 630).

Figure 7:
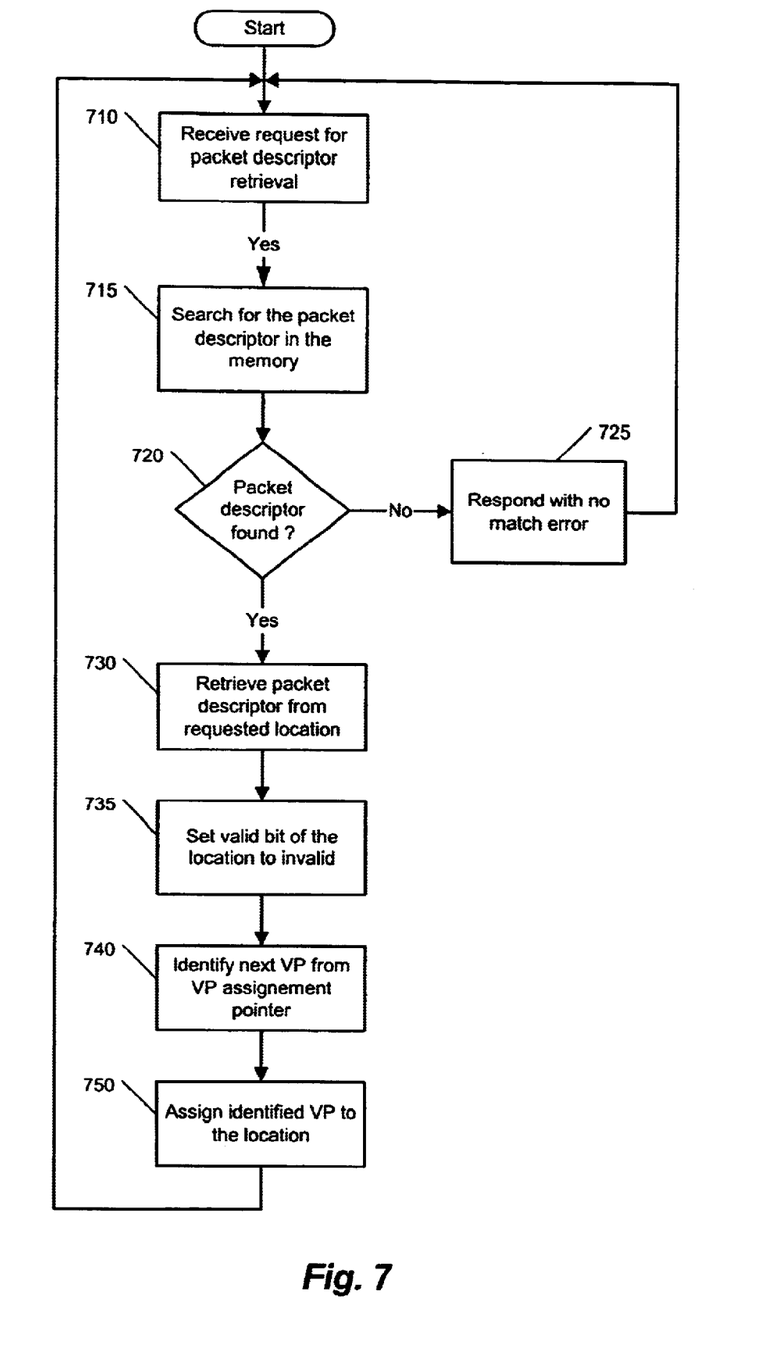
FIG. 7 is a flow chart illustrating the actions performed during the process of retrieving a data packet from a CAM according to an embodiment of the present invention.

FIG. 7 is a flow chart illustrating the actions performed during the process of retrieving a data packet from a CAM according to an embodiment of the present invention. The system initially receives a request for packet descriptor retrieval (step 710). The system searches for the packet descriptor (step 715). The system determines if the packet descriptor is found in the CAM (step 720). If the packet descriptor is not found in the CAM, the system responds with no match error (step 725). The system proceeds to receive the next packet descriptor retrieval request (step 710). If a match is found, the system retrieves the packet descriptor from the location (step 730). The system sets the location bit to indicate that the location is free (step 735). The system identifies the next VP from a VP assignment pointer (step 740). The VP assignment pointer can be configured to assign VPs to freed location in any order (e.g., round-robin, highest VP first, maintain original VP assignment or assign locations in any order desired by the user). The system assigns the identified VP to the freed location (step 750). The system proceeds to receive next packet descriptor retrieval request (step 710).

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A method for managing free entries in a content-addressable memory, the method comprising:
assigning a plurality of memory locations in said content-addressable memory to a plurality of virtual pages;
pre-fetching an address of at least one free memory location from at least one of said virtual pages; and
storing said address in a free entry list.

2. The method of claim 1, further comprising:
retrieving said address from said free entry list; and
storing data in said content-addressable memory using said address.

3. The method of claim 2 wherein said pre-fetching and said storing is done by a free entry pointer.

4. The method of claim 3, wherein said free entry pointer is a hardware-based controller.

5. The method of claim 3, wherein said free entry pointer is a software-based pointer.

6. The method of claim 2, wherein said assigning is done by a virtual page assignment pointer.

7. The method of claim 6, wherein said virtual page assignment pointer is a hardware-based controller.

8. The method of claim 6, wherein said virtual page assignment pointer is a software-based pointer.

9. The method of claim 2, wherein said assigning of said plurality of virtual pages is done by setting a plurality of bits of said plurality of memory locations in said content-addressable memory.

10. The method of claim 2, wherein said assigning of said plurality of virtual pages is independent of a physical address of said plurality of memory locations.

11. The method of claim 2, wherein said storing said address in said free entry list is done on a round-robin basis for each one of said virtual pages.

12. The method of claim 2, wherein
each writing of data is done in a different virtual page than a previous writing of data; and
said pre-fetching said address of free memory location in one of said virtual pages is done while data is being written in a different virtual page.

13. The method of claim 2, further comprising:
receiving a first data to write in said content-addressable memory;
searching for a first address of first memory location in said free entry list; and
if said first address of said first memory location is not found, generating an error message.

14. The method of claim 13, further comprising:
if said first address of said first memory location is found in said free entry list,
writing said first data in said first memory location; and
setting a valid bit of said first memory location to indicate 'not free'.

15. The method of claim 14, further comprising:
removing said first address of said first memory location from said free entry list;
pre-fetching a second address of a second free memory location in said content-addressable memory; and
storing said second address of said second free memory location in said free entry list.

16. The method of claim 15, wherein
said pre-fetching said second address of said second free memory location is done from one of said virtual pages assigned to said first memory location.

17. The method of claim 16 wherein said content-addressable memory is a binary content-addressable memory.

18. The method of claim 16, wherein said content-addressable memory is a ternary content-addressable memory.

19. The method of claim 14, further comprising:
receiving a request to retrieve a second data from said content-addressable memory.

20. The method of claim 19, further comprising:
searching for said second data in said content-addressable memory; and
if said second data is not found in said content-addressable memory, responding with an error.

21. The method of claim 20, further comprising:
if said second data is found in said content-addressable memory,
retrieving said second data from a third memory location,
setting said valid bit of said third memory location to indicate 'free', and
assigning one of said virtual pages to said third memory location.

22. The method of claim 21, wherein said assigning said virtual page to said third memory location is done in a round-robin manner.

23. The method of claim 21, wherein said third memory location is assigned a different virtual page than said third memory location had before said retrieval of said second data.

24. A memory management system to manage free entries in a content-addressable memory comprising:
a content-addressable memory;
a virtual page assignment pointer coupled to said content-addressable memory, wherein said virtual page assignment pointer is configured to assign a plurality of memory locations in said content-addressable memory to a plurality of virtual pages;
a free entry pointer coupled to said content-addressable memory, said free entry pointer is configured to identify an address of at least one free memory location from at least one of said virtual pages; and
a free entry list coupled to said content-addressable memory, said free entry list is configured to store said address.

25. The system of claim 24, wherein a network element comprises said memory management system.

26. The system of claim 24, further comprising:
a processor coupled to said content-addressable memory, said processor is configured to provide controls for said memory management system in said network element; and
a network interface coupled to said processor in said network element, said network interface provides communication interface for said network element.

27. The system of claim 26, wherein said free entry pointer is a hardware-based controller.

28. The system of claim 26, wherein said free entry pointer is a software-based pointer.

29. The system of claim 26, wherein said virtual page assignment pointer is a hardware-based controller.

30. The system of claim 26, wherein said virtual page assignment pointer is a software-based pointer.

31. The system of claim 26, wherein said virtual page assignment pointer is configured to set a plurality of bits of said plurality of memory locations in said content-addressable memory to indicate a virtual page assignment.

32. A network element comprising:
a content-addressable memory;
a processor coupled to said content-addressable memory, said processor is configured to
assign a plurality of memory locations in said content-addressable memory to a plurality of virtual pages,
pre-fetch an address of at least one free memory location from at least one of said virtual pages, and
store said address in a free entry list.

33. The network element of claim 32, wherein said processor is further configured to
retrieve said address from said free entry list; and
store data in said content-addressable memory using said address.

34. The network element of claim 33 wherein said pre-fetching and said storing is done by a free entry pointer.

35. The network element of claim 33, wherein said free entry pointer is a hardware-based controller.

36. The network element of claim 33, wherein said free entry pointer is a software-based pointer.

37. The network element of claim 33, wherein said assigning is done by a virtual page assignment pointer.

38. The network element of claim 37, wherein said virtual page assignment pointer is a hardware-based controller.

39. The network element of claim 37, wherein said virtual page assignment pointer is a software-based pointer.

40. The network element of claim 33, wherein said assigning of said plurality of virtual pages is done by setting a plurality of bits of said plurality of memory locations in said content-addressable memory.

41. The network element of claim 33, wherein said assigning of said plurality of virtual pages is independent of a physical address of said plurality of memory locations.

42. The network element of claim 33, wherein said storing said address in said free entry list is done on a round-robin basis for each one of said virtual pages.

43. The network element of claim 33, wherein
each writing of data is done in a different virtual page than a previous writing of data; and
said pre-fetching said address of free memory location in one of said virtual pages is done while data is being written in a different virtual page.

44. The network element of claim 33, wherein said processor is further configured to
receive a first data to write in said content-addressable memory;
search for a first address of first memory location in said free entry list; and
if said first address of said first memory location is not found, generate an error message.

45. The network element claim 44, wherein said processor is further configured to
if said first address of said first memory location is found in said free entry list,
write said first data in said first memory location; and
set a valid bit of said first memory location to indicate 'not free'.

46. The network element of claim 45, wherein said processor is further configured to
remove said first address of said first memory location from said free entry list;
pre-fetch a second address of a second free memory location in said content-addressable memory; and
store said second address of said second free memory location in said free entry list.

47. The network element of claim 46, wherein
said pre-fetching said second address of said second free memory location is done from one of said virtual pages assigned to said first memory location.

48. The network element of claim 47 wherein said content-addressable memory is a binary content-addressable memory.

49. The network element of claim 47, wherein said content-addressable memory is a ternary content-addressable memory.

50. The network element of claim 45, wherein said processor is further configured to
receive a request to retrieve a second data from said content-addressable memory.

51. The network element of claim 50, wherein said processor is further configured to
search for said second data in said content-addressable memory; and
if said second data is not found in said content-addressable memory, respond with an error.

52. The network element of claim 51, wherein said processor is further configured to
if said second data is found in said content-addressable memory,
retrieve said second data from a third memory location,
set said valid bit of said third memory location to indicate 'free', and assign one of said virtual pages to said third memory location.

53. The network element of claim 52, wherein said assigning said virtual page to said third memory location is done in a round-robin manner.

54. The network element of claim 52, wherein said third memory location is assigned a different virtual page than said third memory location had before said retrieval of said second data.

55. A system for managing free entries in a content-addressable memory comprising:
means for assigning a plurality of memory locations in said content-addressable memory to a plurality of virtual pages;
means for pre-fetching an address of at least one free memory location from at least one of said virtual pages; and
means for storing said address in a free entry list.

56. The system of claim 55, further comprising:
means for retrieving said address from said free entry list; and
means for storing data in said content-addressable memory using said address.

57. The system of claim 56 wherein said pre-fetching and said storing is done by a free entry pointer.

58. The system of claim 57, wherein said free entry pointer is a hardware-based controller.

59. The system of claim 57, wherein said free entry pointer is a software-based pointer.

60. The system of claim 56, wherein said assigning is done by a virtual page assignment pointer.

61. The system of claim 60, wherein said virtual page assignment pointer is a hardware-based controller.

62. The system of claim 60, wherein said virtual page assignment pointer is a software-based pointer.

63. The system of claim 56, wherein said assigning of said plurality of virtual pages is done by setting a plurality of bits of said plurality of memory locations in said content-addressable memory.

64. The system of claim 56, wherein said assigning of said plurality of virtual pages is independent of a physical address of said plurality of memory locations.

65. The system of claim 56, wherein said storing said address in said free entry list is done on a round-robin basis for each one of said virtual pages.

66. The system of claim 56, wherein
each writing of data is done in a different virtual page than a previous writing of data; and
said pre-fetching said address of free memory location in one of said virtual pages is done while data is being written in a different virtual page.

67. The system of claim 56, further comprising:
means for receiving a first data to write in said content-addressable memory;
means for searching for a first address of first memory location in said free entry list; and
if said first address of said first memory location is not found, generating an error message.

68. The system of claim 67, further comprising:
means for writing said first data in said first memory location if said first address of said first memory location is found in said free entry list; and
means for setting a valid bit of said first memory location to indicate 'not free' if said first address of said first memory location is found in said free entry list.

69. The system of claim 68, further comprising:
means for removing said first address of said first memory location from said free entry list;
means for pre-fetching a second address of a second free memory location in said content-addressable memory; and
means for storing said second address of said second free memory location in said free entry list.

70. The system of claim 69, wherein
said pre-fetching said second address of said second free memory location is done from one of said virtual pages assigned to said first memory location.

71. The system of claim 70 wherein said content-addressable memory is a binary content-addressable memory.

72. The system of claim 70, wherein said content-addressable memory is a ternary content-addressable memory.

73. The system of claim 68, further comprising:
means for receiving a request to retrieve a second data from said content-addressable memory.

74. The system of claim 73, further comprising:
means for searching for said second data in said content-addressable memory; and
means for responding with an error if said second data is not found in said content-addressable memory.

75. The system of claim 74, further comprising:
means for retrieving said second data from a third memory location if said second data is found in said content-addressable memory,
means for setting said valid bit of said third memory location to indicate 'free' if said second data is found in said content-addressable memory, and
means for assigning one of said virtual pages to said third memory location if said second data is found in said content-addressable memory.

76. The system of claim 75, wherein said assigning said virtual page to said third memory location is done in a round-robin manner.

77. The system of claim 75, wherein said third memory location is assigned a different virtual page than said third memory location had before said retrieval of said second data.

78. A computer program product for managing free entries in a content-addressable memory, encoded in computer readable media, said program product comprising a set of instructions executable on a computer system, said set of instructions configured to:
assign a plurality of memory locations in said content-addressable memory to a plurality of virtual pages;
pre-fetch an address of at least one free memory location from at least one of said virtual pages; and
store said address in a free entry list.

79. The computer program product of claim 78, wherein said set of instructions is further configured to
retrieve said address from said free entry list; and
store data in said content-addressable memory using said address.

80. The computer program product of claim 79, wherein said set of instructions is further configured to
receive a first data to write in said content-addressable memory;
search for a first address of first memory location in said free entry list; and
if said first address of said first memory location is not found, generate an error message.

81. The computer program product of claim 80, wherein said set of instructions is further configured to
if said first address of said first memory location is found in said free entry list,
write said first data in said first memory location; and
set a valid bit of said first memory location to indicate 'not free'.

82. The computer program product of claim 81, wherein said set of instructions is further configured to
remove said first address of said first memory location from said free entry list;
pre-fetch a second address of a second free memory location in said content-addressable memory; and
store said second address of said second free memory location in said free entry list.

83. The computer program product of claim 82, wherein said set of instructions is further configured to
receive a request to retrieve a second data from said content-addressable memory.

84. The computer program product of claim 83, wherein said set of instructions is further configured to
search for said second data in said content-addressable memory; and
if said second data is not found in said content-addressable memory, respond with an error.

85. The computer program product of claim 84, wherein said set of instructions is further configured to
if said second data is found in said content-addressable memory,
retrieve said second data from a third memory location,
set said valid bit of said third memory location to indicate 'free', and
assign one of said virtual pages to said third memory location.

* * * * *